Patented Oct. 23, 1923.

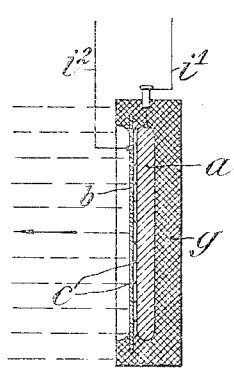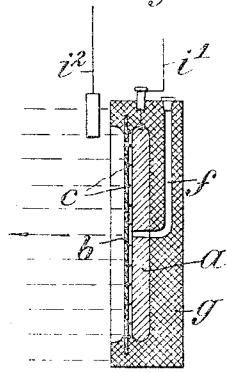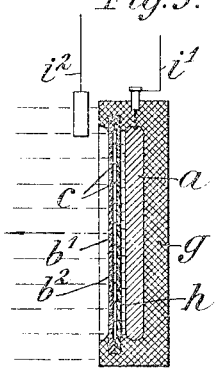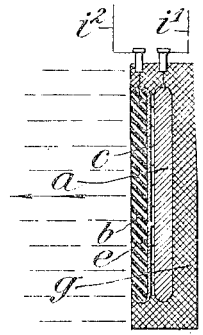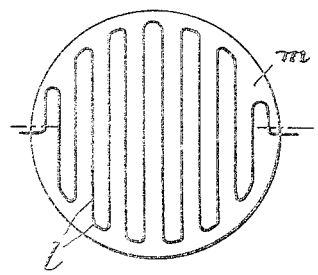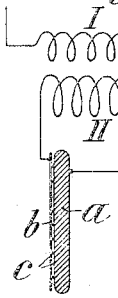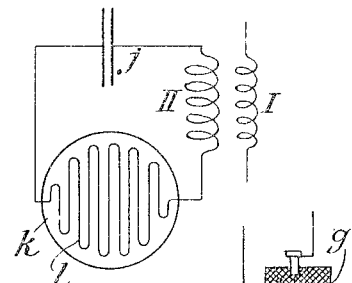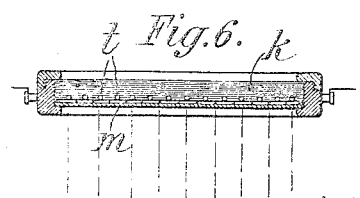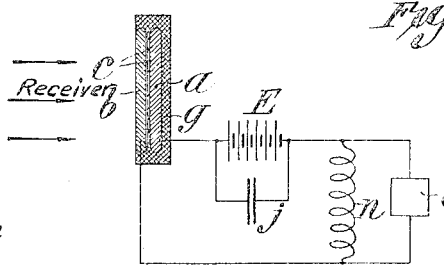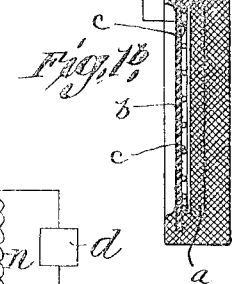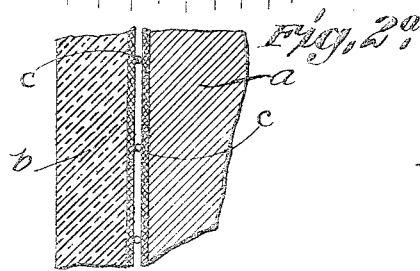

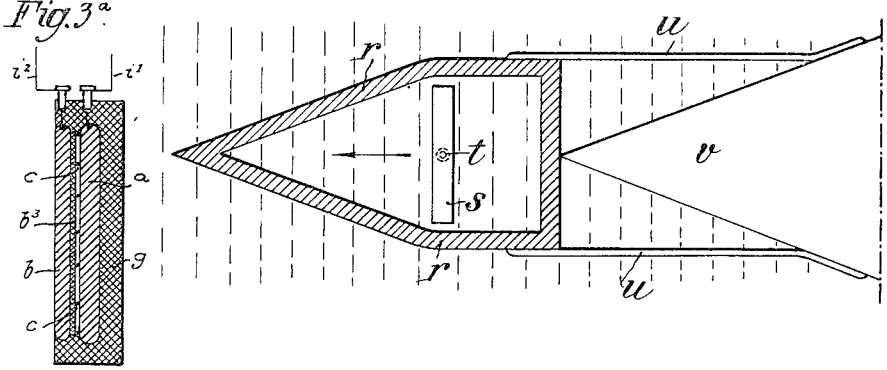
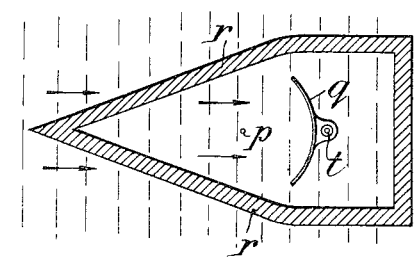
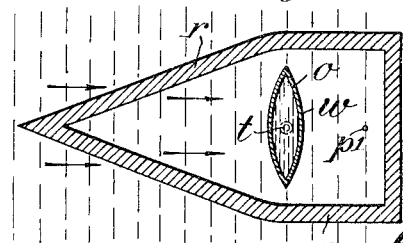
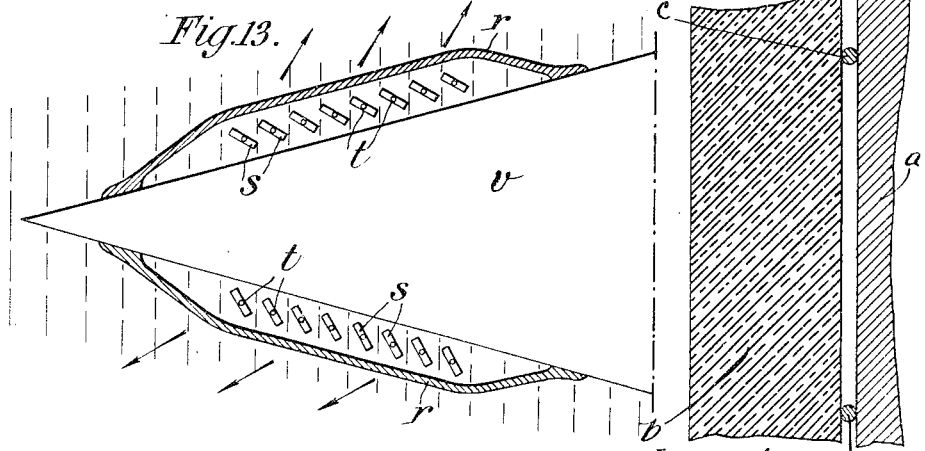

1,471,547

UNITED STATES PATENT OFFICE.

CONSTANTIN CHILOWSKY AND PAUL LANGEVIN, OF PARIS, FRANCE.

PRODUCTION OF SUBMARINE SIGNALS AND THE LOCATION OF SUBMARINE OBJECTS.

Application filed May 19, 1917. Serial No. 169,804.

*To all whom it may concern:*

Be it known that we, CONSTANTIN CHILOWSKY and PAUL LANGEVIN, the former a citizen of the Government of Russia and the latter a citizen of the Republic of France, both residing in Paris, France, have invented certain new and useful Improvements in the Production of Submarine Signals and the Location of Submarine Objects, of which the following is a specification.

Acoustic methods have before been proposed to detect at a distance in water obstacles dangerous to navigation, such as mines, submarines, torpedoes, rocks, icebergs, ships in foggy weather, and the like.

But their efficiency is greatly reduced as the sound emitted spreads in all directions and rapidly weakens as the distance increases; on the other hand the reception of the sonorous echo produced by the obstacle indicates but with difficulty the position of same.

The process and apparatus which are the subject of the present invention do not present these defects, and moreover permit of producing directed secret signals for military purposes.

The method consists in producing under water ultra-sonorous mechanical oscillations, that is to say, of a very high frequency, by the synchronous vibrating motion of all the points of a transmitting surface, whose linear dimensions are large in proportion to the wave length in the water of the emitted oscillations.

Under these conditions, the energy emitted remains almost completely localized in a transmitting cone, the axis of which is normal to the radiating surface and whose opening or angle will be relatively smaller as the ratio between the area of the transmitting surface and the wave length becomes larger. For a transmitting surface of a diameter $d$, the sine of the opening angle $\alpha$ of this cone (half the angle of the apex) will be given by the formula:

$$\sin. \alpha = 0.6 \frac{\lambda}{d}$$

$\lambda$ being the wave-length in the water.

The ultra-sonorous beam thus obtained is similar to the luminous beam of a searchlight and can be used, either to produce signals or to detect the presence of obstacles by the observations of the diffused or reflected radiation.

For practical purposes, the frequency of the oscillations used will be from 50,000 to 200,000 per second with wave-lengths of 3 to 0.7 centimetres (the velocity of propagation of the elastic or mechanical waves in water being about 1500 metres per second), and the diameter of the transmitting surface from 30 to 100 centimetres.

Oscillations of greater frequency are too rapidly absorbed in water owing to its viscosity and slower oscillations would give too open beams; nevertheless in certain cases, lower frequencies can be used with a transmitting apparatus of a larger diameter. Higher frequencies can be employed at shorter distances.

To obtain a synchronous vibration of the whole of the transmitting surface, the invention consists in the use of electrical oscillations of high frequency, such as are produced for wireless telegraphy or telephony, and making use of the mechanical actions produced by electric or magnetic fields to transform the energy of said electrical oscillations into ultra-sonorous vibrations with a frequency double that of the electrical oscillations, these actions exerting themselves synchronously and evenly on the whole of the transmitting surface.

Either maintained electrical oscillations can be used (produced by alternators, speaking arcs or heterodyne lamps) or trains of damped oscillations obtained by means of sparks.

The mechanical vibrations thus obtained will act on the receiving apparatus (microphones or parts similar to the transmitting apparatus) and will produce electrical oscillations with a frequency equal to theirs, which will be revealed by a known apparatus such as those used in wireless telegraphy.

The location of obstacles is obtained in direction by giving to the transmitting surface the position necessary to have an echo of maximum intensity, and in distance by observing the time between the transmission of a signal and the return of the echo produced on the obstacle.

The invention will be described with reference to the accompanying drawings which illustrate more or less diagrammatically both the theory and practice of the invention.

Fig. 1 represents in section a transmitting apparatus having an electric field.

Fig. 1ª is a view on a larger scale in which the ratio of the dimensions have been preserved, of the condensers shown in Fig. 1.

Fig. 1ᵇ is a view similar to Fig. 1 showing a slight modification.

Fig. 2ª is a view on a larger scale in which the ratio of the dimensions have been preserved, of a portion of a modified form of apparatus according to the invention.

Figs. 2, 3, 3ª and 4 show various modifications of apparatus having an electric field.

Figs. 5 and 6 represent in plan and in section a transmitting apparatus having a magnetic field.

Figs. 7 and 8 are diagrams of the connections of apparatus having electric and magnetic fields respectively.

Fig. 9 is a receiving apparatus with an electric field showing the diagram of connections.

Fig. 10 represents a horizontal section through a chamber filled with water containing the transmitting apparatus.

Fig. 11 represents a horizontal section of a chamber with a receiving apparatus and a concave mirror.

Fig. 12 represents the same receiving chamber with a lens instead of the mirror shown in Fig. 11.

Fig. 13 represents the horizontal section of an alternative arrangement of transmitting apparatus placed at each side of the bow of the ship.

In the type of transmitting apparatus shown in Fig. 1, the transformation of electrical energy into mechanical energy is obtained by means of the electro-static attractions in a condenser forming part of an oscillating circuit. The power of the elastic oscillations emitted is determined by the amplitude of the variations of the electric field in the condenser.

The condenser is composed of a metallic insulated plate $a$ of 30 to 100 centimeters, placed in an insulating support $g$, and maintained by the points of support $c$ at a very short distance (1 to 10 microns) from a thin plate $b$ of metal or of insulating material. The plate $a$ may, if desired, be non-metallic and have a metallic coating on its surface facing $b$.

The opposite side of $b$ being in contact with the water, this plate $b$ answers freely to the periodical electrostatic attraction of the plate $a$, either by its bending between its points of support, or by the greater or less embedding of these in the elastic substance of the plates $a$ or $b$. The smaller the distance between $a$ and $b$ the greater will be the efficiency of the apparatus provided that said distance remains greater than the amplitude of the vibrations of $b$.

The plate $a$ is connected to one of the poles of the electric circuit $i^1$; the plate $b$ to the other pole $i^2$.

In order to obtain the freedom of vibration by the embedding of the points of support in one of the plates, one of said plates must consist of a slightly elastic substance, such as ebonite, ivory or the like, where the other plate is of metal, otherwise the condenser plate must be covered with a layer of a similar slightly elastic substance with a metal coating on its surface to permit of the charging of the condenser and the action of the electric field.

Alternatively the points of support may be very thin and consist either of lines or points of varnish or of mica strips or washers. The total surface of the points of support must be fairly small so that the effort of attraction permits of their yielding.

In order that the condenser may carry the high electric fields (superior to $10^6$ volts per centimeter of distance between the plates) which are necessary for the transmission of powerful elastic waves (of the value of a watt per square centimeter) three processes can be made use of:—

1. The condenser plates may be covered with a coating of platinum, gold or the like, able to support in a vacuum at short distances very high electric fields, and a very high vacuum of four ten-thousandths of a mm. of mercury may be kept up between the plates. This vacuum is not necessary and the atmospheric pressure can be maintained if the distance between the plates is sufficiently small, the potential difference employed varying proportionally with this distance.

2. The production of the disruptive discharge can be prevented by covering the metallic surfaces with a thin coating of insulating material such as mica, cellulose-acetate, or the like, and having between them a vacuum, or not, according to their distance.

3. As shown in Fig. 2, a thin mica diaphragm $b$ can be used, or a diaphragm of any other elastic insulating material, in contact with the water, acting at the same time as a vibrating plate and as insulation for the condenser, with or without a vacuum between the diaphragm $b$ and the plate $a$; in this case, the water forms the exterior charge-bearer of the condenser, and the points of support $c$ separating the mica diaphragm $b$ from the plate $a$ can either be metallic or insulating.

The vacuum can be made through a tube $f$ with an opening of small diameter in the centre of the insulated plate or in the periphery of same. An insulating substance $g$ is run behind the plate and around the sides of the condenser. The plate $a$ is connected to one of the poles of the electric circuit $i^1$, the other pole $i^2$ dipping into the water with the diaphragm $b$.

The modification of the apparatus shown in Fig. 3 consists of a symmetrical diaphragm made of two thin insulating sheets $b^1$, $b^2$ of mica, glass or the like, joined at their edges and separated by the points of support $c$ in the space in which their vibration would be free. A vacuum can also be made between them when the sheets $b^1$, $b^2$ are of glass or the like.

One side of the diaphragm would be in contact with the salt water in which would be produced a radiating surface, formed by the exterior plate of the condenser fed by $i^2$, the other side being in contact with a layer of a liquid insulated conductor $h$ (salt water, mercury, or the like) forming the interior plate of the condenser fed by $i^1$ and $a$.

The diaphragm of the condenser in contact with the water may consist of a metallic plate $3^a$, the thickness of which is equal to the half wave-length of the longitudinal elastic vibrations in the substance of the plate employed. This plate vibrates in the direction of its thickness (that is to say, by contraction and dilation, the faces of the plate approach and move away one from the other) and acts upon the water by its external face with an amplitude and periodicity equal to that of the electrostatic attraction exerted on its internal face by the electric field of the condenser.

This interior face of the diaphragm may, or may not, be covered with an insulating layer $b^3$ to prevent a disruptive discharge. Having a plate with a thickness of half a wave-length permits of reducing the number of points of support between itself and the insulated plate owing to its smaller flexure; the electric oscillations employed are required to have the same period as that of the vibration of the diaphragm.

The property which ebonite possesses of not giving any notable reflection of the longitudinal elastic waves on its separation surface with the water, permits using a plate of ebonite $b$ (Fig. 4) in contact with the water as a plate of any thickness (vibrating in the direction of its thickness) with a metallic coating on its interior face forming the exterior plate of the condenser fed by $i^2$ and separated from the insulated plate $a$ fed by $i^1$ by suitable insulating supports $c$.

In this case it is not necessary that the frequency of the transmitting vibrations should be in resonance with the vibrating exterior plate in the direction of its thickness, and any frequency may be emitted as with the apparatus having a thin vibrating plate.

The transmitting or receiving apparatus permitting the use of magnetic action is shown in Figs. 5 and 6 in which $k$ is a plate of thin soft iron laminations on the surface of which is arranged in a zig-zag shape an insulated copper wire 1 carrying an electric current of very high frequency; at a short distance from this plate and separated by some points of support, there is a thin soft iron plate $m$ having its exterior face in contact with the water.

The diagram of connections is given in Fig. 7, for the apparatus utilizing electrostatic action, and in Fig. 8 for that making use of magnetic action.

In the first case, the transmitting condenser $a$, $b$ has the function of capacity in the oscillating circuit II excited by induction by means of a primary coil I; and in the second case (Fig. 8) the winding $l$ of the plate $k$ forms a part of the self-induction of the oscillating circuit II provided with a suitable capacity $j$ and excited by the primary winding I.

For the receiving device, a microphone may be used providing that its vibrating plate is in contact with the water and has points of support the resistance variations of which are caused by the arrival of ultrasonorous waves, producing periodical variations of equal frequency in the current produced through this microphone by a constant electromotive force.

These variations produce electric oscillations in a tuned circuit, either directly, if this circuit is placed between the microphone terminals, or by induction of the microphone is in series with the primary coil of a transformer, of which the secondary winding is formed by the self-induction of the oscillation circuit.

With the receiving apparatus, Fig. 9, the energy of the incident electric waves may be transformed into electric oscillations by receiving these on a condenser $a$, $b$ similar to those used for transmission, but the plates of which may be brought closer (about a micron) due to the feeble amplitude of the elastic displacements. A source of constant electromotive force E keeps the condenser $j$ charged (an optimum value exists for this) and the variations of capacity produced by the incident waves cause electric oscillations in a tuned oscillating circuit of which this condenser $a$, $b$ forms a part. The elastic energy may be absorbed and converted into electric energy, if the electromotive force of the source E has an optimum value as indicated below. Then the incident elastic waves are absorbed by the surface of the condenser $a$, $b$ and do not undergo any reflection in this case.

The electric oscillations will be registered by any kind of detector, for example, a vacuum tube amplifier $d$, the connections of which with the oscillating circuit may be varied according to the method adopted in wireless telegraphy.

The optimum value E of the electromotive force is given by the formula:

$$E = \omega d \sqrt{\rho VRS}$$

where $\omega$ is equal to the wave period or $2\pi n$ where $n$ is the cyclic frequency of the wave and $\pi = 3.1416$, $d$ the distance between the plates of the condenser $a$, $b$, Fig. 9; S the surface area of these plates; $\rho$ the density of salt water; V the velocity of propagation of sound in this medium; R the ohmic resistance of the self-induction coil $n$ connected to the condenser to obtain a circuit in syntony with the frequency of the waves in use.

In Fig. 9, $j$ is a condenser of large capacity presenting to the passage of the oscillations created in the electric circuit an impedance much smaller than that of the battery E; this condenser is mounted in a cascade arrangement with $a$, $b$ and the two condensers $j$ and $a\,b$ taken together represent the capacity of the oscillating circuit.

A receiving apparatus similar to the one suggested for magnetic transmission (Figs. 5 and 6, may be used if the copper wire carries a current from a constant source. The conversion of the mechanical energy of the incident waves into electric oscillations in a tuned circuit is made by means of the variations of self-induction of the apparatus due to the periodic movement of the exterior plate in contact with the water. The transformation is effected in the best conditions if the continuous source possesses a convenient optimum electromotive force.

To protect the transmitting and receiving apparatus against the shock of the waves, these will be placed in a box with thick ebonite walls $r$ (Fig. 10), making use of the property of this substance as previously indicated. This may, for instance, be placed at the front of the ship V, held by the brackets $u$, the exterior shape of the solid being that of smallest resistance. The interior of the box with ebonite sides should be filled with water and the transmitting apparatus $s$ (Fig. 10) may be placed in different directions, for example around the vertical axis projecting at $t$.

To increase the sensitiveness of the receiver, the receiving apparatus may be placed in the focus of a concave mirror $q$ of a large surface (Fig. 11) or in the focus of a lens (Fig. 12) of a large diameter constituted by a cover $o$ transparent to the waves (ebonite, for example) filled with a liquid (ether, alcohol or the like) in which the velocity of propagation will be less than in water. This lens or mirror may be turned around a pivot $t$ so that its axis passes through the source or through the obstacle in such manner that its optical axis shall be situated in the direction of the source or the obstacle.

To avoid the transmitting surface having very considerable dimensions when very high powers are emitted, and to retain the faculty to change the direction of the beam as desired, this surface may be divided up into independent sets S (Fig. 13) placed in parallel, turning round parallel pivots $t$, on condition that the wave lengths are varied when used in setting these sets, so that the normal distance between two transmitting elements is a complete multiple of the wave length.

Under these conditions, the waves sent out by these sets in directions normal to their planes are kept in synchronism. As stated previously, this apparatus may be placed in an ebonite cover $r$ and fixed to the sides of the ship V.

The methods and apparatus described may be applied to the following cases:—

1. Exchange of directed submarine signals between ships, or between ships and coast stations, or between coast stations. These signals have the advantages of optical signals and are superior in that they cannot be hindered by fog or haze.

2. In establishing ultra-sonorous stations with transmitting surfaces of a very large diameter.

3. Searching for and locating submarine obstacles by means of periodic and tuned transmissions during the interval of which the return of an echo is perceived.

The relative motion of the obstacle and the observation post may be determined by applying Doppler's method, that is to say, by observing the change of frequency due to the movement of the obstacle, particularly sensitive in the sonorous beats obtained between the received oscillations which are due to vibrations reflected by the obstacle, and the oscillations produced by an adequate source, these latter oscillations having a frequency which is approximately that of the received oscillations and may be produced by a heterodyne lamp.

4. Searching and locating submarine objects by the ultra-sonorous shadow which they give on the receiving apparatus if their dimensions are large in proportion to the wave length in the water of the vibrations employed.

Having thus described the nature of the said invention and the best means we know of for carrying the same into practical effect, we claim:—

1. Means for producing and receiving directed beams of ultra-sonorous rays which are transmissible in ordinary matter, comprising a plate having a large diameter in proportion to the wave length of the elastic vibrations emitted, and means for synchronously vibrating the entire surface thereof, said plate having a diameter of 30 to 100 centimeters and said waves having a length between 3 and .7 centimeters.

2. Means for producing and receiving directed beams of ultra-sonorous rays in water, comprising a plate having a large diameter in proportion to the wave length of the elastic vibration to be emitted in the water, and means, for setting into to and fro motion the whole surface of said plate in contact with the water, said plate having a diameter of 30 to 100 centimeters and said waves having a length between 3 and .7 centimeters.

3. Means for producing and receiving directed beams of ultra-sonorous rays in water, comprising a plate having a large diameter in proportion to the wave length of the elastic vibration to be emitted in the water, and a field of force equally distributed over the surface of the plate for setting into to and fro motion the whole surface of said plate in contact with the water, said field of force being produced by electrical oscillations of high frequency, said plate having a diameter of 30 to 100 centimeters and said waves having a length between 3 and .7 centimeters.

4. An apparatus to produce and transmit ultra-sonorous beams in water, which comprises a plane condenser of great surface having an insulated metallic plate and a thin plate in contact with water the condenser being part of an electric circuit of high frequency, the periodic electric field of great amplitude produced between the two plates causing the thinner one to vibrate, and means enabling the condenser to resist the necessary intense electric field by reduction of the distance between the metallic and insulating plates of the condensers, said plate having a diameter of 30 to 100 centimeters and said waves having a length between 3 and .7 centimeters.

5. An apparatus to produce and transmit ultra-sonorous beams in water, which comprises a plane condenser of great surface having an insulated metallic plate and a thin plate of any elastic insulating substance in contact with the salt water, said plate acting as the exterior diaphragm of the condenser, said plate resting on the insulated plate by means of insulating or conducting supports between which it can vibrate freely, the condenser being part of an electric circuit of high frequency, the periodic electric field of great amplitude produced between the two plates causing the thinner one to vibrate, and means enabling the condenser to resist the necessary intense electric field by reduction of the distance between the metallic and insulating plates of this condenser and keeping up a high vacuum in the intervals, said plate having a diameter of 30 to 100 centimeters and said waves having a length between 3 and .7 centimeters.

6. Apparatus according to claim 4, having, in place of the vibrating plate therein specified, as a vibrating plate, a plate of the thickness of a half wave length in resonance with the elastic vibrations emitted.

7. Apparatus according to claim 4, having, in place of the vibrating plate therein specified, as a vibrating plate, a plate of ebonite of any thickness with a metallic coating, the product of the density by the velocity of the sound being about the same in this substance as in salt water.

8. Apparatus as claimed in claim 4, the diaphragm being a substance with a thickness of a quarter wave length in which the product of the density by the velocity of the vibrations are inferior to that of salt water, whereby the emitted electric energy for a given amplitude of the electric or magnetic field of the apparatus is increased.

9. In apparatus as claimed in claim 4, several sets of apparatus in parallel, the frequency being varied in the setting so that the normal distance between any two of them always remains equal to a whole number of wave lengths in the water.

In witness whereof we have hereunto signed our names in the presence of two subscribing witnesses.

CONSTANTIN CHILOWSKY.
PAUL LANGEVIN.

Witnesses:
 CHAS. P. PRESSLY,
 HENRI CARTIER.